United States Patent [19]

Roest et al.

[11] 3,954,696

[45] May 4, 1976

[54] PROCESS OF PREPARING A-B-C ELASTOMERIC BLOCK COPOLYMERS

[75] Inventors: Bernard C. Roest, Geleen; Herman A. J. Schepers, Stein, both of Netherlands

[73] Assignee: Stamicarbon, B.V., Geleen, Netherlands

[22] Filed: Apr. 3, 1974

[21] Appl. No.: 457,647

Related U.S. Application Data

[63] Continuation-in-part of Ser. No. 350,987, April 13, 1973, abandoned, which is a continuation of Ser. No. 98,406, Dec. 15, 1970, abandoned.

[30] Foreign Application Priority Data

Dec. 19, 1969   Netherlands..................... 6919054

[52] U.S. Cl.............................................. 260/880 B
[51] Int. Cl.$^2$......................................... C08L 53/02
[58] Field of Search ............................... 260/880 B

[56] References Cited

UNITED STATES PATENTS

| | | | |
|---|---|---|---|
| 3,231,635 | 1/1966 | Holden............................ | 260/880 B |
| 3,265,765 | 8/1966 | Holden............................ | 260/876 |
| 3,390,207 | 6/1968 | Moss................................ | 260/879 |
| 3,560,593 | 2/1971 | Hsieh.............................. | 260/880 B |
| 3,737,421 | 6/1973 | Halasa............................ | 260/94.2 M |
| 3,825,623 | 7/1974 | La Flair.......................... | 260/879 |

*Primary Examiner*—Christopher A. Henderson, Jr.
*Attorney, Agent, or Firm*—Cushman, Darby & Cushman

[57] ABSTRACT

A method for preparing a block polymer A—B—C with alkyl lithium where the improvement is in the formation of block B. The method of forming block B which is a conjugated diene is carried out without the removal of contaminants.

7 Claims, No Drawings

PROCESS OF PREPARING A-B-C ELASTOMERIC BLOCK COPOLYMERS

This is a continuation-in-part of our earlier copending application Ser. No. 350,987 filed Apr. 13, 1973 now abandoned which in turn is a continuation of our earlier application Ser. No. 98,406 filed Dec. 15, 1970 now abandoned.

This invention relates to anionic polymerisation for the preparation of block copolymers of the type having a general formula A—B—C obtained by polymerizing one or more monomers to form the polymer starting block A, adding one or more monomers and continuing the polymerization to form polymer block B bound to starting block A, and adding and polymerizing further one or more monomers to form the terminal block C, thus completing the A—B—C block copolymer. This invention also relates to artefacts wholly or partly made of such block copolymers.

A process for the preparation of A—B—C block copolymers whose A and C blocks each consist of a non-elastic homopolymer or copolymer and whose B block consists of an elastomeric homo- or copolymer, and which are termed "thermolastics" has already been described in U.S. Pat. No. 3,265,765. That process can also be used for the preparation of three-block copolymers each of whose A, B and C blocks may be elastomeric or non-elastomeric.

British Patent Specification No. 1,068,130 suggests that in the anionic polymerization to three-block copolymers of the A—B—C configuration it is not a simple matter to prevent or exhibit premature termination of the growth of the polymer chains, which may result in the undesirable formation of one-block and two-block polymers.

The term "one-block polymer" as used herein denotes a homopolymer or a so-called random copolymer. "Two-block polymer" denotes a polymer formed of two segments, each consisting of another homopolymer or random copolymer.

British Patent Specification No. 1,014,999 discloses the problem arising from the presence of contaminants in three-stage anionic block copolymerization wherein during a three-stage polymerization the polymerization process is unexpectedly terminated due to contamination of the feed. Such premature termination may occur when the particularly small amount of initiator used in this polymerization meets one or more well-known deactivating contaminants, such as oxygen, carbon dioxide and water. Examples of other chain terminating impurities are carbonmonoxide, active hydrogen containing compounds such as hydrogenchloride, hydrogensulfide, hydrogencyanide and other acids, halogencontaining compounds such as chlorine, bromine, fosgene, methylchloride, methylbromide, dichloroethane, dibromoethane, dibromomethane, trichloroethene, alkylchloride, bromosuccinamide, sulfurcontaining compounds such as sulfurdioxide and methylmercaptane, unsaturated compounds such as acetylene, propyne, vinylacetylene, vinylethyne, butyne, methylcyanide, acrylonitrile, ethylisocyanate, formaldehyde oxime, divinylbenzene, alcohols, aldehydes, ketones and carboxylic acids such as methanol, ethanol, ethanal, acetone, methylethylketone, acetic acid, formic acid, esters and derivatives from carboxylic acids such as methylester of acetic acid, ethylester of propionic acid, propionic acid anhydride, acetic acid chloride etc. Such termination of the polymerization reaction results in the presence of one-block and two-block polymers in the reaction product. The two-block material drastically impairs the mechanical and physical properties of the three-block polymer. Conventionally these contaminants are deactivated in the monomers by treating all monomers with an excess of initiator with respect to the quantity of interfering contaminants. However, in the preparation of three-block polymers addition of a small excess of initiator to all monomers in the second or third stage will suffice to cause formation of two-block and one-block polymers, respectively. In practice there appears to be no simple way of determining with sufficient accuracy the amount of initiator needed to exactly deactivate all contaminating matter and thus to prevent formation of one-block and two-block products.

The invention provides a process of preparing block copolymers of the general formula A—B—C by polymerization in the presence of an anionic initiator of at least one monomer to form polymer block A, adding at least one further monomer and continuing the polymerization to form polymer block B bound to polymer block A, and adding at least one monomer, to form the terminal polymer block C, resulting in the A—B—C block copolymer, wherein the said process for the preparation of the A and C polymer blocks monomers are used wherein the contaminants, harmful to the initiator, are completely deactivated and for the preparation of the B polymer block a monomer(monomers) is (are) used which contain(s) contaminants capable of killing 1 to 50 % of the living polymer block A.

The amount of living polymer block A is of course equal to the amount of initiator that initiated polymerisation.

Preferably the monomers contain an amount of contaminants that is capable of killing 5 to 40 %, especially 10 to 25 % of the living polymer block A.

It has been found that A—B—C block copolymers prepared according to the invention are completely or virtually free of two-block polymers.

The complete deactivation of the contaminants in the monomers from which polymer blocks A and C are formed can be effected by addition of any anionic initiator to the monomers, in an amount at least sufficient for the amount of contaminants harmful to the initiator. The complete deactivation of the impurities in the monomers from which polymer blocks A and C are formed can also be effected by first purifying by any physical means, e.g. destillation, molecular sieves, and subsequently deactivating the contaminants remaining from purification by addition of anionic initiator. An indication of an excess of initiator is used to deactivate all contaminants in the monomers can be found for some monomers, for instance styrene, α-methyl styrene and other vinylaromatic compounds in a colouration caused by mesomerism in the anion of these monomers. The indication if an excess of initiator is used to deactivate all contaminants in monomers, which give no colouration upon formation of its anion, for instance butadiene, may be found in the colouration caused by adding a small amount of colouring monomer, such as styrene to a solution of butadiene in a polar solvent e.g. tetrahydrofurane. If so desired, an anionic initiator may be added to the monomer, or monomer mixture, from which polymer block B is formed, but preferably this addition should be made in an amount smaller than that needed to deactivate all contaminants harmful to the initiator used in the polymerization. It is possible first to add a sufficient amount of initiator and next a desired amount of contaminating matter, e.g. water. Preferably, the deactivation is carried out with the initiator with which the monomers are polymerized to the A—B—C block copolymer.

If the block copolymer A—B—C is prepared by batch polymerization, the best results are obtained if the complete amount of monomer that is to form polymer block B is added to the reaction mixture at once. In such a batch polymerization process it is also possible to introduce the monomer or monomer mixture that is to form polymer block B as a continuous stream or in several portions. However, in this case the advantage inherent in the process according to the invention is not utilized optimally.

If however, the A—B—C block polymer is prepared in a continuous process, e.g. in a tubular reactor, the best results are obtained if the monomer or monomer mixture that is to form polymer block B is added in a continuous stream.

The initiator used for the polymerization to A—B—C block copolymers may be any anionic initiator, and is preferably an alkyl-alkali metal compound, particularly such compounds wherein the alkyl group does not contain more than 8 carbon atoms per molecule and more particularly alkyl lithium compound. It is advantageous to use alkyl-lithium compounds which possess a branched chain, since these have a short induction period. Particular examples of initiators are isobutyl lithium, iso-amyl lithium and secondary amyl lithium, and in particular secondary butyl lithium.

The deactivation with initiator may take place in an inert hydrocarbon solvent suitable for the polymerization. Such solvents include α-olefins or lower alkanes, ethers and cyclo-aliphatic hydrocarbons, and aromatic hydrocarbons for example benzene and toluene. Solvent mixtures may be used. The deactivation of the contaminants in the monomer or monomer mixture from which polymer block A is formed can expeditiously be effected in the reactor proper.

The process according to the invention can be used for the preparation of A—B—C block copolymers in which each of the A, B and C blocks may be elastomeric or non-elastomeric. However it is preferred that the A and C-blocks each consist of a non-elastomeric homopolymer or copolymer and the B block is an elastomeric homopolymer or copolymer, i.e. the so-called thermolastics. These compounds appear to have rubber-like properties even without being cured. Furthermore such thermolastics can be processed in a way commonly used for thermoplastic materials, for instance by extrusion or injection moulding.

The presence of two-block copolymers considerably impairs tensile strength, the permanent set at break and other characteristics of thermolastics.

The A and C blocks of the elastomeric block copolymers may consist of any non-elastomeric polymer block, preferably polymers having a glass transition temperature above 25°C, particularly over 50°C. Examples are polymer blocks derived from alkenyl-aromatic hydrocarbons. Examples thereof are polymers of styrene, methyl styrene and chlorostyrene, and polymers of acrylonitrile, methyl methacrylate, 2-chloroethyl acrylonitrile, phenyl methacrylate, methyl acrylate, α-methyl acrylonitrile. The A and C blocks may also be identical, although this is not necessary.

The number average molecular weight of the said polymer blocks may be in the range from 200 to 100,000 and preferably have number average molecular weight between 500 and 50,000. The elastomeric middle section of the said elastomeric block copolymers may be a polymer block of a synthetic elastomer with a glass transition temperature below −10 °C, such as homopolymers of a conjugated diene, notably 1,3-butadiene and isoprene and copolymers, for instance of butadiene and styrene. The number average molecular weight of the elastomeric middle section is generally between 25,000 and 1,000,000, preferably between 50,000 and 500,000. The polymerization to block copolymers of the general formula A-B-C according to the invention may be carried out at a temperature between −80 °C and 100 °C, although higher or lower temperatures may be used. The preferred temperature is between −30 °C and 75 °C.

The polymerization can be terminated in the usual way by adding a compound yielding protons, e.g. an alcohol or water.

The following Examples of the invention are provided. The tensile strength, and elongation at rupture were measured according to NEN 5602, and the permanent set at break according to NEN 5606.

EXAMPLES

A. 200 ml of dried oxygen free cyclohexane and 10 ml of styrene were introduced into a 500 ml reactor under nitrogen. Secondary butyl lithium was then added to the styrene solution until the colour turned yellow, indicating that all contaminants had been deactivated. Thereupon a calculated amount of secondary butyl lithium (0,25 mmole) was added, and polymerization effected at 50°C until virtually all styrene had been converted into 9 grams of polystyrene.

To form the second block, 50 ml of isoprene were added to the reaction mixture, whose contaminants had not been deactivated by an excess of initiator, and polymerization was effected at 50°C until all the isoprene had been used up. Subsequently 10 ml of styrene was pretreated with an anionic initiator (secondary butyl lithium), until the colour just turned yellow, and the so treated styrene introduced into the reactor. After all styrene has been polymerized, the reaction product was stabilized and coagulated and worked up in a conventional manner. The styrene-isoprene-styrene block copolymer formed in this way had a number average molecular weight of 36,000 − 136,000 − 36,000 for the blocks A—B—C.

In order to indicate the amount of contaminants present in the isoprene feed capable of interfering with anionic initiator the following titration was carried out.

To a glass vessel was added 25 ml cyclohexane, 2 ml styrene and 2 ml tetrahydrofurane. With a solution of sec. butyllithium (0.2 molar) in cyclohexane the mixture was titrated till the first light yellow coloration appeared, in order to deactivate the contaminants already present in the cyclohexane. Then 15 ml isoprene were introduced and the titration was started again. A light yellow coloration appeared after adding an amount of 0.05 ml sec. butyllithiumsolution, that is 0.01 mmol.

Thus in the isoprene feed such an amount on contaminants is present that 0.67 mmol sec. butyllithium per liter isoprene is needed to deactivate them.

So in the 50 ml isoprene used in the polymerisation 0.035 mmol sec. butyllithium was consumed to deactivate contaminants.

The balance, that was 0.25–0.035 = 0.215 mmol sec. butyllithium caused the polymerisation.

So in the polymerisation step $$\left(\frac{0.035}{0.25} 100\ \%\right) = 14\ \%$$

of the living polymers were killed by the contaminants.

B. The above Example was repeated, except that the isoprene was treated before with 0.035 mmol sec. butyllithium in order to deactivate all the impurities. In this way again a styrene-isoprene-styrene block copolymer was formed of practically the same molecular weight.

The properties of the resulting reaction products were as follows:

|   | tensile strength (kg/cm$^2$) | permanent set (%) | elongation (%) |
|---|---|---|---|
| A | 220 | 13 | 930 |
| B | 184 | 25 | 1040 |

The Example was repeated except that the monomers were treated with n-pentyl lithium. Similar results were obtained.

What is claimed is:

1. In a process for the preparation of block copolymers of the general formula A—B—C including polymerizing at least one monomer to form a living polymer block A, adding a further monomer and continuing polymerization to form polymer block B bound to polymer block A, and continuing polymerization while adding at least one monomer to form terminal polymer block C, thereby producing an A—B—C block copolymer, wherein each of polymer blocks A and C consists of a non-elastomer homopolymer or copolymer having a glass transition temperature over 25°C. and a number average molecular weight between 200 and 100,000, and polymer block B consists of a conjugated diene having a glass transistion temperature below −10° C. and a number average molecular weight between 25,000 and 1,000,000;

and wherein the contaminants contained in the monomers forming blocks A and C are deactivated, the improvement comprising introducing the conjugated diene monomer forming polymer block B containing therein contaminants which have not been deactivated and are capable of killing 1–50% of the living polymer block A.

2. A process according to claim 1, wherein the said contaminants in polymer blocks A or B or C are deactivated by incorporation in the monomer mixture of anionic initiator in a sufficient proportion to effect the said deactivation.

3. A process according to claim 2, in which the said anionic initiator used for deactivation is the same as that used in carrying out the polymerization to form the said block copolymer.

4. A process according to any of claim 1, in which the anionic initiator used for the said deactivation is secondary butyl lithium.

5. A process according to claim 1, in which each of the polymer blocks A and C consists of a non-elastomeric polymer block having a glass transition point over 50°C and a number average molecular weight between 500 and 50,000, and polymer block B consists of an elastomeric polymer block having a glass transition point below −25°C and a number average molecular weight between 50,000 and 500,000.

6. A process according to claim 1, in which the conjugated diene is 1,3-butadiene or isoprene.

7. A process according to claim 1, in which at least one of polymer blocks A and C is derived from a monovinylaromatic hydrocarbon.

* * * * *